Figure 1:
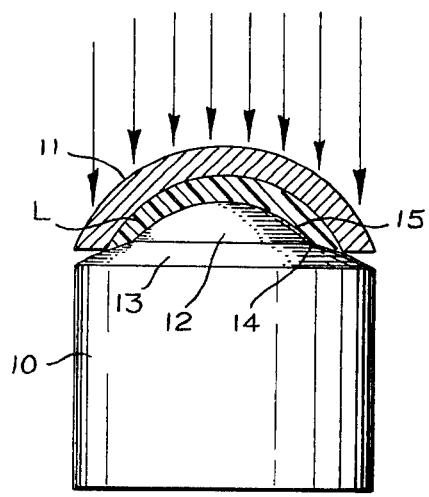

United States Patent [19]
Robinson

[11] 4,017,238
[45] * Apr. 12, 1977

[54] MOLD FOR CASTING CONTACT LENSES UTILIZING AND ELECTRON BEAM TO POLYMERIZE THE RESIN LENS

[75] Inventor: Charles C. Robinson, Sturbridge, Mass.

[73] Assignee: American Optical Corporation, Southbridge, Mass.

[ * ] Notice: The portion of the term of this patent subsequent to Oct. 28, 1992, has been disclaimed.

[22] Filed: Apr. 21, 1975

[21] Appl. No.: 570,042

[52] U.S. Cl. .............................. 425/174.6; 264/1; 264/22; 264/337; 425/808
[51] Int. Cl.² ..................... B29D 11/00; B29C 3/00
[58] Field of Search .......... 427/135; 29/196.9, 199; 249/116; 425/174.6, 808, 174.8 R, 174.8 E; 164/19, 46; 264/22, 337, 219, 232, 1

[56]  References Cited
UNITED STATES PATENTS

| 2,948,664 | 8/1960 | Rubens | 264/22 X |
| 3,221,083 | 11/1965 | Crandon | 264/1 |
| 3,284,175 | 11/1966 | Spence | 29/199 X |
| 3,563,870 | 2/1971 | Tung | 264/22 X |
| 3,563,973 | 2/1971 | Arditti | 264/22 |
| 3,645,861 | 2/1972 | Garvey | 29/196.6 X |
| 3,721,534 | 3/1973 | Kubick | 29/196.6 X |
| 3,841,598 | 10/1974 | Grucza | 425/808 X |
| 3,915,609 | 10/1975 | Robinson | 425/174.6 |

Primary Examiner—Ronald J. Shore
Assistant Examiner—John S. Brown
Attorney, Agent, or Firm—Alan H. Spencer; William C. Nealon; H. R. Berkenstock, Jr.

[57] ABSTRACT

A mold for casting contact lenses from an unpolymerized resin such as silicone gum wherein the resin is polymerized by high energy radiation such as an electron beam. One part of the mold is a cap capable of transmitting such radiation. The male section of the mold is gold plated to minimize reaction between the resin and the male section under the influence of the electron beam.

3 Claims, 3 Drawing Figures

MOLD FOR CASTING CONTACT LENSES UTILIZING AND ELECTRON BEAM TO POLYMERIZE THE RESIN LENS

FIELD OF THE INVENTION

Molds for casting contact lenses which are to be polymerized within the mold, and especially for casting plastic contact lenses of the type which are classed as "soft lenses."

DESCRIPTION OF THE PRIOR ART

The prior art includes two-piece molds for casting soft contact lenses, which receive a blank of unpolymerized resins, such as a blend of silicone gums, and shape the resin into a lens or a lens blank. Thereafter, cross linking and polymerization of the resins within the mold is effected by high energy radiation such as an electron beam. The construction of molds for contact lenses which are to be manufactured in this manner includes a thin walled portion or cap forming one side of the mold and the electron beam will pass through this mold cap without excessive interference by the material forming the mold cap. Such mold caps can be thin walled, stainless steel members or preferably quartz or glass of a suitable thickness. A mandrel is used to hold the thin wall mold cap against distortion and permit it to be pressed against the opposing portion of the mold to precisely form the resin blank into a contact lens. Thereafter, the mandrel is removed and the thin wall cap will hold the newly formed lens in place while radiation is applied to the mold. My co-pending application Ser. No. 452,176 filed Mar. 18, 1974, now U.S. Pat. No. 3,915,609, more fully describes the molds and mandrel.

It has been observed that the high energy radiation of a beam, of an intensity sufficient to quickly polymerize a resin such as a silicone gum, will also cause pitting at the upper surface of stainless steel male mold section. Apparently a reaction occurs between the resin and the stainless steel which results in this pitting of the mold and it is believed that the resin and the metal oxides at the surface of a polished male section react with each other. Regardless of the cause, the pitting reduces the life of the male section to the point where it is usable for only a few castings. Also, the migration of metal or oxide from the mold into the resin detracts from the quality of lens produced.

SUMMARY OF THE INVENTION

It was found that this pitting of a male section would be insignificant when the metal contacting the resin was gold, and the basic concept of the invention is to provide a protective layer of gold on the male section to prevent the observed pitting and deterioration at the inner surface of the male section. It is to be noted that the small molds for casting contact lenses are manufactured to very close tolerances and any surface coating to be used must be very thin to stay within the required tolerances. Also, it was found that the gold layer will not adhere satisfactorily to the stainless steel male section and that an underlay of a metal such as a nickel chromium alloy, must be applied before the layer of gold can be applied. It was found that a very thin underlay and a very thin layer of gold could be deposited to the surface of the male section through vaporizing techniques such as "sputtering" or high vacuum thermal evaporation. The deposition of such material in such techniques is upon other surfaces in the container, such as the male mold section.

ADVANTAGES OF THE INVENTION

An advantage of the invention is to provide an improved construction of a male mold section for molds which form contact lenses and the like from unpolymerized resins and polymerize the resins within the mold by an electron beam directed through the cap.

Another advantage of the invention is to provide in such an improved male mold section, surface which will not pit or otherwise deteriorate by the action of an electron beam being directed on the male section while polymerizing resin within the mold.

Another advantage of the invention is to provide a simple and effective coating at the surface of a male mold section which prevents pitting and deterioration of this surface when it is subjected to the influence of an electron beam for polymerizing resins within the mold and thereby permits the male section to be used repeatedly many times.

Another advantage of the invention is to provide, in a male mold section which is precisely machined to form a small object such as a contact lens, a protective coating at the surface of the male mold section which is applied in a simple, easy mode as a very thin layer which will not affect the dimensions of the mold.

Other advantages of the invention will become apparent from the following description and the present invention comprises certain constructions, combinations and arrangements of elements and sequences and steps as hereinafter described, defined in the appended claims and diagrammatically illustrated in the accompanying drawing in which:

FIG. 1 is a side elevational view, partly in section, to illustrate a mold for casting a contact lens from a resin which includes a thin cap to permit the resin within the mold to be polymerized by an electron beam.

Figure 2:
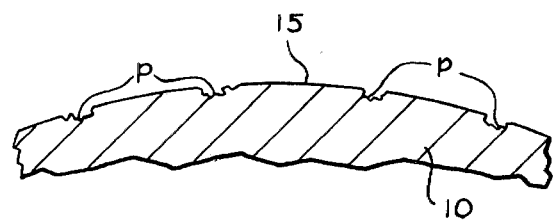
Figure 3:
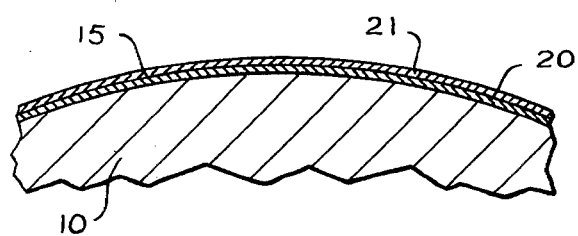

FIG. 2 is a diagrammatic sectional fragment of the male section illustrated at FIG. 1 but on a greatly enlarged scale to depict deterioration of the male section by pitting as may be caused by an electron beam; and FIG. 3 is a sectional fragment similar to FIG. 2 to indicate the manner in which protective layers are deposited on the surface of the male section to prevent the pitting depicted in FIG. 2.

DESCRIPTION OF AN EMBODIMENT OF THE INVENTION

The present invention concerns the manufacture of small articles to be made of unpolymerized resin, such as silicone gum, and which are to be polymerized by an electron beam or other high energy radiant source while the resin is in the mold forming the article. A preferred use of the invention resides in the manufacture of soft contact lenses and for partially finished blanks of such lenses. The molds to form these lenses are precisely machined so that the lenses will be very close to, if not at, the final prescription dimensions and a minimum of subsequent finishing operations will be required.

Referring more particularly to the drawing, a mold which may be used for the formation of a soft lens is illustrated at FIG. 1. This mold is formed with a cylindrical base 10 and a thin wall section 11 which overlies the base, with the mold cavity lying between the base and the male section. To ordinarily use this mold, a blank of silicone gum is placed between the base 10 and the cap 11 and the mold components are then pressed together to form the lens L. These initial operations will be performed in a suitable press with a mandrel, not shown, to hold the thin wall cap 11 against distortion during the pressing operation. After the mold is removed from the press and the mandrel removed from the male section, the mold is placed in the path of a high energy electron beam such as that produced by a Van De Graaff generator. The electron beam is directed through the cap as indicated by arrows E at FIG. 1 with a resulting polymerization of the resin, as hereinafter further described.

The base 10 is an upright cylindrical block formed of a suitable rigid hard material such as stainless steel, glass or amorphous quartz which is neutral to the action of silicone gum or any other resin to be used in the mold. The top surface of the base is preferably the male portion of the mold to form the posterior side of a contact lens. As such, this surface will be contoured to duplicate the curvatures of a selected human eye in a concentric pattern with respect to the axis of the mold. Accordingly, a central portion 12 of the mold surface is spherical with a radius approximately corresponding to the cornea of an eyeball. An outer portion 13 surrounding this central cornea portion 12 is also spherical with a radius approximately corresponding to that of an eyeball. The two portions joined at an edge 14 representing the edge of the cornea. In the mold, this edge 14 is preferably rounded on a slight radius to produce a smooth surface casting without any corners thereon.

The cap 11 is a thin, circular dish shaped member having a diameter which may be the same as the diameter of the base 10.

The convex surface 15 of the base 10 and this surface 15 will form the outer concave posterior surface of the lens cast in the mold. As such, this surface 15 is usually spherical and when it is formed according to a selected lens prescription, the lens cast in the mold will be finished except for edging operations. When the concave surface 15 is shaped to form a finished lens according to prescription, the convex surface of the mold must be formed and polished with a high degree of precision. Preferably, the male section 10 is formed of stainless steel for strength and rigidity.

In polymerizing lenses in a mold with an electron beam, as above described, it was found that a pitting action at the surface 15 of the male section would occur, such as the pits P as diagrammatically shown at FIG. 2. It is generally assumed that a resin such as silicone rubber will not react with stainless steel, but apparently this is not so whenever an electron beam irradiates the materials. Possibly a reaction occurs between the silicone gum and the metal oxides in the surface of the polished stainless steel male section. Regardless of the actual cause, such pits and other types of surface deterioration which have been observed to occur cannot be tolerated in forming a finished contact lens, not only because the same disrupts the smooth optical surface of the lens, but also because the metal or metal oxides in the surface of the male section will be deposited into the resin material and detract from the clarity of the lens. Moreover, the precisely finished male sections are too expensive to manufacture and then to be used only a few times.

The basic concept of the present invention resides in providing a surface on an inert metal mold section which would resist chemical action with the resin when an electron beam was applied to polymerize the resin.

It was found that gold was one material which would be chemically neutral with a silicone rubber gum in the presence of an electron beam radiation. Other materials, such as platinum, may be used. Tests demonstrated that a mold section 10 having a layer or plate of gold at its convex surface would not pit to any noticeable degree. However, gold will not adhere to stainless steel in a satisfactory manner and it was necessary to apply an underlayer of a metal compatible with and which would bond with both gold and stainless steel. A satisfactory type of underlayer was found to be a nickel chromium alloy, such as Inconel, a proprietary name for such an alloy which is manufactured by the International Nickel Company of New York City.

Accordingly, as illustrated at FIG. 3, a layer 20 of Inconel is first deposited against the convex surface 15 of the mold section 10 and thereafter, a layer of gold 21 is deposited upon this layer of Inconel. To prepare a mold section 10 for deposition of these layers upon it, the convex surfaces of the mold were machined to a selected prescription and polished in a regular manner. Then, the polished surface was carefully cleaned with a detergent solution and finally cleaned with isopropyl alcohol before it was placed in the vacuum chamber. The vacuum deposition above described was continued until uniform, solid layers of metal were deposited in each instance. The actual thickness of the deposits could be varied considerably depending upon the duration of the operations. However, these layers were so thin that measurements of thickness were not practical. It was found that suitable depositions of both the Inconel and the gold could be obtained by a skilled operator merely observing the vacuum deposition. A proper timing for the operation was established by a few simple trials.

It was found that such a finishing operation need not be applied to the surfaces of the mold cap 11 because pitting did not occur to any significant degree upon these surfaces. However, if desired, the protective metal could be applied likewise to the mold surfaces of the cap 11. The finished mold sections, having a layer 21 of gold at their surfaces 15, permitted repeated uses of the mold without deterioration by the electron beam. While the manner of forming a gold layer is not entirely critical, the application by vacuum deposition has definite advantages over other modes of application. Moreover, it is possible to vacuum deposit onto other surfaces than metal and this permits the application of a layer of gold onto a mold section of glass should it become desirable to manufacture sections 11 of such a material.

The description above set forth will enable those skilled in the art to practice the invention which is hereinafter more specifically defined by the appended claims.

What is claimed is:

1. A mold including a thin-walled cap member and a base member for casting contact lenses and the like by forming the lens within the mold from unpolymerized resin and subsequently polymerizing the resin while it is within the mold by the action of an electron beam directed against the thin-walled mold member and passing therethrough to act upon the resin, wherein said base member comprises:

a stainless steel member having a surface shaped to conform with one surface of the lens being cast within the mold and being susceptible to pitting when acted on by an electron beam in the presence of a resin; and a layer of inert metal covering said surface to protect the surface from the pitting resulting from the action of the electron beam.

2. The mold defined in claim 1 wherein the inert metal is gold.

3. The mold defined in claim 2, wherein:
the stainless steel member has a nickel chromium layer deposited on the surface to form an underlayer whereon a layer of gold is deposited.

* * * * *